(12) United States Patent
Love et al.

(10) Patent No.: US 9,892,465 B2
(45) Date of Patent: *Feb. 13, 2018

(54) SYSTEM AND METHOD FOR SUSPECT ENTITY DETECTION AND MITIGATION

(71) Applicant: Early Warning Services, LLC, Scottsdale, AZ (US)

(72) Inventors: Robin S. Love, Scottsdale, AZ (US); Glen Sgambati, Glendale, AZ (US); Frederick Wedgeworth, Scottsdale, AZ (US); Mary Winters, Phoenix, AZ (US); Lucius L. Lockwood, Phoenix, AZ (US)

(73) Assignee: Early Warning Services, LLC, Scottsdale, AZ (US)

( * ) Notice: Subject to any disclaimer, the term of this patent is extended or adjusted under 35 U.S.C. 154(b) by 625 days.

This patent is subject to a terminal disclaimer.

(21) Appl. No.: 14/174,798

(22) Filed: Feb. 6, 2014

(65) Prior Publication Data

US 2014/0222631 A1 Aug. 7, 2014

Related U.S. Application Data

(63) Continuation of application No. 13/410,150, filed on Mar. 1, 2012, now Pat. No. 8,682,764.
(Continued)

(51) Int. Cl.
*G06Q 40/00* (2012.01)
*G06F 17/30* (2006.01)
(Continued)

(52) U.S. Cl.
CPC ............. *G06Q 40/12* (2013.12); *G06Q 10/10* (2013.01); *G06Q 40/08* (2013.01)

(58) Field of Classification Search
CPC combination set(s) only.
See application file for complete search history.

(56) References Cited

U.S. PATENT DOCUMENTS 5,491,817 A * 2/1996 Gopal ............... G06F 17/30067
707/770
6,954,737 B2 10/2005 Kalantar et al.
(Continued)

OTHER PUBLICATIONS

International Search Report and Written Opinion of PCT/US2012/027344 dated Jun. 7, 2014, 9 pages.
(Continued)

*Primary Examiner* — Luna Champagne
(74) *Attorney, Agent, or Firm* — Kilpatrick Townsend & Stockton LLP

(57) ABSTRACT

A plurality of institutions (such as financial institutions) contribute data to a data analysis and linking system. The system analyzes the data to create data nodes (records) associated with an entity, where the entity may be, for example, a person/individual, business, organization, account, address, telephone number, etc. After data is linked, and in order to retrieve linked data, a requester may provide to the system an identifier associated with an entity. The linked data provided by the system in response to the identifier may be in the form of a network of data nodes associated with the entity and for use in assessing risk, such as risk associated with a transaction being conducted by a person. The linked data may also be analyzed at the system to score risk associated with the entity, and the risk score provided in conjunction with or in lieu of the network of data nodes.

25 Claims, 12 Drawing Sheets

Related U.S. Application Data

(60) Provisional application No. 61/448,156, filed on Mar. 1, 2011.

(51) Int. Cl.
*G06F 7/00* (2006.01)
*G06Q 10/10* (2012.01)
*G06Q 40/08* (2012.01)

(56) References Cited

U.S. PATENT DOCUMENTS

| | | | |
|---|---|---|---|
| 8,209,246 B2* | 6/2012 | Lawrence | G06Q 20/10 235/440 |
| 8,356,052 B2* | 1/2013 | Zhang | G06Q 10/067 705/35 |
| 2004/0024693 A1 | 2/2004 | Lawrence | |
| 2009/0099884 A1 | 4/2009 | Hoefelmeyer et al. | |
| 2009/0198686 A1* | 8/2009 | Cushman, II | G06F 17/30303 |
| 2010/0223199 A1 | 9/2010 | Zhang et al. | |
| 2011/0087606 A1* | 4/2011 | Hammond | G06Q 10/06 705/304 |

OTHER PUBLICATIONS

International Preliminary Report on Patentability of PCT/US2012/027344 dated Mar. 12, 2014, 10 pages.

\* cited by examiner

SYSTEM AND METHOD FOR SUSPECT ENTITY DETECTION AND MITIGATION

CROSS-REFERENCES TO RELATED APPLICATIONS

This application is a continuation of U.S. patent application Ser. No. 13/410,150, filed Mar. 1, 2012, which claims the benefit of U.S. Provisional Patent Application No. 61/448,156, filed on Mar. 1, 2011, the complete disclosures of which are herein incorporated by reference for all purposes.

BACKGROUND OF THE INVENTION

Various institutions collect large amounts of information for processing, decision making and other purposes. As one example involving financial institutions, information is collected on people and on the accounts used for transactions. Such data is analyzed to authenticate a person conducting a transaction or determine if a transaction is suspicious or fraudulent. The data collected may come from many sources and in many different forms, and as such it may be difficult to understand how different pieces of information may relate to specific person or transaction.

BRIEF SUMMARY OF THE INVENTION

Embodiments of the invention provide systems and methods for linking data from a plurality of data sources, and using the linked data for analysis, such as risk assessment. In order to link the data, data elements of a data record are examined for characteristics that may be shared with data elements of other data records.

In one embodiment, data records having data elements with similar or shared characteristics are stored in a data structure as virtual nodes and linked together in a network of data nodes. Each network is associated with one or more entities. Through identification and analysis of such networks, many types of risks may be identified and mitigated, including multiple types of bank fraud activities. These bank fraud activities may include, but are not limited to money laundering, terrorist finance activity, account takeover, demand deposit account fraud and credit card first party fraud. In various embodiments, networks are identified by the creation of social network links across data from multiple sources through the analysis of entity relationships and behavioral patterns. These patterns and relationships are in turn determined from the application of analysis techniques to the multiple data sources, thereby uncovering hidden relationships between people, data, devices, and behavior.

In one embodiment, a system and method is provided for linking data from a plurality of data sources. Data records from the data sources are received at a processing system. Each data record is parsed to identify and possibly modify one or more data elements, and data elements from different data records are compared to determine if any two data elements have common characteristics. When a data element from one data record has a characteristic in common with a data element from another data record, a linking identifier is created that identifies the two data records as linked. The linked data records, and the linking identifier that identifies the data records as linked, are stored in a data storage device. When a data record is accessed by an end user (also referred to herein as a "data user"), linking identifiers are used to access other linked data records.

DETAILED DESCRIPTION OF THE INVENTION

Figure 1:
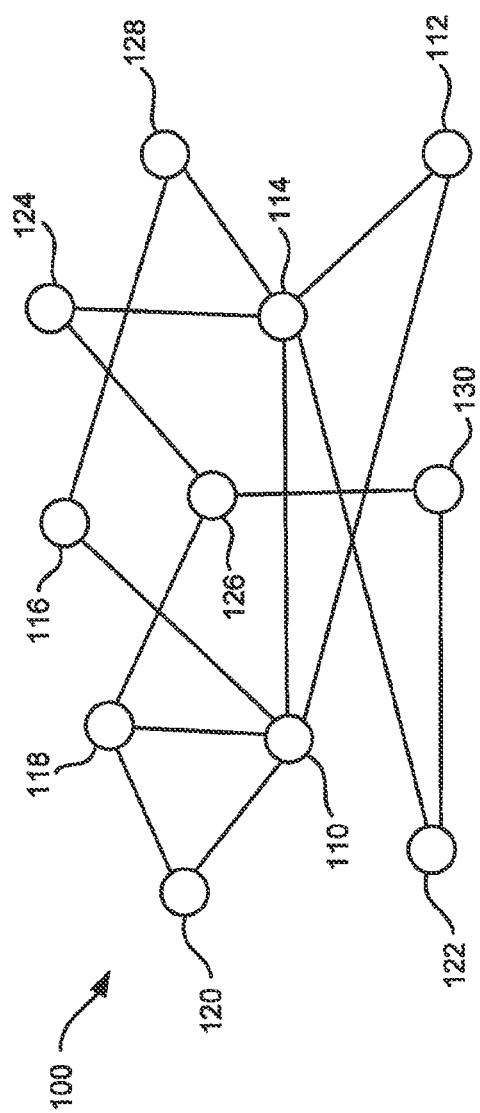
FIG. 1 is a diagram illustrating a network of data nodes, linked together in accordance with methods and systems of the invention.

Embodiments of the invention provide methods and systems for linking data that is received from a plurality of different data sources, and making the linked data available for evaluation, processing or analysis. The plurality of different data sources may include any desired number and type of databases that may enhance the prediction of risk factors such as the likelihood of fraud. The plurality of different data sources may comprise, for example but not by way of limitation, collections of databases from one or more financial service organizations including banks, lenders, mortgage origination companies, credit card companies, traveler's cheque companies, brokerage firms, short-term or payday loan companies, financial planners, investment firms, and the like; collections of databases from federal, state, or local government agencies; collections of databases from online sales or service providers; collections of data from lodging, rental, or apartment providers; collections of data from common carrier providers such as airline, train, or bus services; collections of data from insurers; collections of data from social networking organizations; collections of data from utility providers including wired or wireless telecommunications, cable, energy, water, sewerage, trash, and the like; and combinations thereof.

Data to be linked is received as a plurality of data records, each having data fields or elements that relate to a data entity. An entity may be, for example, a person (individual), organization, address, event, device, account, or transaction. In its broadest sense, an event may generally be any tangible or intangible object for which information may be collected. Systems and methods described herein analyze the data received, examine the data elements of the data records for common characteristics, establish and identify relationships or links between data records that have elements with common characteristics, identify, through a scoring algorithm, the riskiest networks in terms of likelihood of fraud, and then store the data and the links that have been established or identified.

The linked data for an entity may be represented to a system analyst or a data user as a network of nodes (each node representing a data record or similar set of data), with the network of linked data nodes relating to that entity. As further described below, one or more additional entities of interest may be present in any linked network, and in various embodiments, related entities may be selectively presented or suppressed depending on the level of analysis needed, or depending on a predetermined threshold of risk associated with each entity to be included in the network. Such presentation or suppression may be performed manually or in an automated computer system by a system analyst, an expert system, an algorithmic approach, a set of heuristics, a fuzzy logic system, a neural network decision engine, or any other appropriate method.

As one example, if an entity is a person, then a network of data nodes may be established and stored for that person. There may be a personal data node or record that contains primary personal information for that person (e.g., name, social security number, home address, telephone number, driver's license number, date of birth, bank and credit card account numbers, etc.), with the data in that record having been either contributed by one data source or contributed by (and built from) multiple data sources. Other nodes in the network contain data records that have been directly or indirectly linked to that person. For example, a second linked node in the network may be a data record relating to the home address of the person of interest (optionally containing detailed information about the home address, such as the type of building, names of other known occupants, all phone numbers associated with that address, names of prior owners/occupants, existence and amounts of mortgages/liens, and so forth). A third linked node may contain a data record for a mobile or fixed phone number of the person, such as the listed phone subscriber's full name, an address associated with the phone number, bill payment history associated with the phone number account, etc.). In addition to nodes that have been directly linked to the person in question, other nodes in the network may be linked indirectly. For example, if there is a second person that is an occupant at the home address, or a second person shown as an account holder on a bank account of the primary person of interest, a data record containing that second person's personal information may be linked as a node, and also any other data records relating to or linked to that second person.

The forgoing is diagrammatically illustrated in simplified form in FIG. 1. As seen, a network 100 has a plurality of data nodes 110-130. The network 100 is associated with a single entity, such as a person. In such case, and using the example just given, node 110 may represent a data record of the primary personal information for that person, node 112 may represent a data record for the home address of the person, node 114 may represent a data record corresponding to the phone number of the person, and so forth. Carrying the example further, other directly linked nodes (116-120) may represent data records associated with the person's driver's license number (e.g., personal information and traffic records), bank or credit card account number (e.g., balances, transaction history, fraudulent activity, returned checks, missed payments, etc.), social security number (e.g., names or variations in names associated with that social security number, if any), and a personal data node having personal information of an identically or very similarly named person (and is thus likely to be the same person). As an example, personal information for "John A. Smith" might be linked when the network of nodes is for a person named "John Andrew Smith." It should be appreciated that these are only a few of many possible examples of data records or nodes that could be directly linked in a network to a primary personal data node.

Also shown in FIG. 1 are nodes 122-130 which are indirectly linked to the primary node 110. In the example given earlier, these could be data records not directly related to the primary person of interest but rather may be personal information for a co-occupant of a primary residence address or a co-owner of a bank or credit card account. These other nodes could be more than one level removed from the primary person of interest. As an example, a linked node could be a personal data record for a person that has no direct relationship to the primary person, but perhaps does have a relationship or link to a person that is shown as co-owner of a bank account with the primary person of interest.

Many other indirect links are possible, with each level of linkage being further removed from the primary person/entity. As will be more fully described later, in the analysis of data for linkage, consideration can be given to the likelihood of data being related, especially in the context of risk assessment and scoring. The levels of linkage and likelihood of data being related (and hence the size of the network 100) can be adjusted depending on the use being made of the data, and the degree of risk tolerance (or, more generally, the desired confidence that the data may be related) of the entity or institution using the data. As should be appreciated, any data node (relating to an entity) may be part of (through a direct or indirect link to) many different data networks (relating to many different entities).

Generally, embodiments of the invention permit data (once it has been linked) to be accessed using an identifier for an entity, for example, an identifier associated with a person conducting a transaction. The identifier is provided to a system managing the linked data, and all linked data nodes in the network associated with the entity can be retrieved. In some cases, the linked data may be provided for data users themselves to assess risk associated with the data. That is, a data user might examine the linked data nodes (and the data represented by each node) and determine, for example, the impact of the data on a decision being made, such as deciding the risk associated with a transaction. In other cases, the linked data is analyzed in advance for risk, and a risk score (either alone or in combination with the linked data) may be provided for making a decision, such as assessing a transaction. Multiple uses may be made of the linked network, for example, but not limited to, identification of suspect entities via their relation with suspicious data records, whereupon an institution such as a financial service organization may take an actions such as determining that an account opened by the suspect entity should be frozen or closed to prevent fraud. In another application, an identified network related to a suspect entity may be utilized to detect potential bust-out fraud, where in one scenario, a fraudster makes a payment on a credit card account with an instrument that will not ultimately clear, and as the issuing bank makes available the appropriate credit balance, the fraudster makes charges against the newly-available balance. In yet another application, casinos or gambling organizations may analyze potential fraudsters who may be attempting to open markers or obtain casino credit with intent to defraud the casino or otherwise engage in money laundering activities. In another application, the network associated with the suspect entity may be used to analyze the potential risk that a transaction being performed by the suspect entity may result in fraud. In yet another application, the network associated with the suspect entity may be analyzed to determine the likely existence of a terrorist cell or a money laundering network.

In one embodiment to be described shortly, a financial institution might use the linked data to assess the risk associated with the financial transaction, such as the deposit of a check, an electronic debit transaction at a POS terminal, an ATM withdrawal, or a transfer of funds between accounts. Unlike many current systems that provide risk assessment based only on one or a few data files stored in association with an account (having information such as past returned checks, account status, or records of past fraud associated with the account), systems and methods of the invention permit an assessment that is based on a much deeper and broader examination of data, i.e., not only data pertaining to the account in question, but also data on parties involved in the transaction, and any records (from many sources, for example, multiple financial service organizations) that may be directly or indirectly related/linked to the transaction, to the account, to any parties involved, or to any other entity that is related or linked to the transaction.

As a more specific, simple example, a financial service organization assessing a check presented for deposit might supply a record of the transaction to the system having stored and linked data nodes. The transaction data might include the name of the payer and the account number of account against which the check is drawn. Such transaction data (provided as one or more identifiers) could be input to the system. For example, in response to the name of a payer (as an identifier), a network of data nodes representing linked data associated (directly or indirectly) to the payer on the check is provided (the linked data could be data records stored in association with the name of the payer or any co-owner of an account with the payer, in association with the address for the payer, in association with the social security number of the payer, and so forth). As mentioned earlier, the data provided in response to the identifier could be the linked data, or a risk score that has been assigned based on the linked data, or a combination thereof. Some specific applications where the systems and methods herein might be used are described in U.S. Pat. No. 7,383,227, issued on Jun. 3, 2008, to Laura Weinflash, et al., in copending U.S. application Ser. No. 12/126,474, filed May 23, 2008, by Laura Weinflash et al., and in U.S. Application No. 61/422,861, filed Dec. 14, 2010, by Laura Weinflash, the complete disclosures of which are incorporated herein by reference for all purposes.

It should be appreciated that the present invention is not limited to assessing data for financial transactions as just described. Many other applications and uses are possible. As examples only, networks of linked data nodes could be used for locating people, properties and assets, confirming identities, conducting background and criminal checks, conducting anti-terrorism investigations, monitoring chat room/social network activity, conducting competitive analysis, investment analysis, transportation route analysis, intellectual capital harvesting, or computer network analysis, and planning or operating manufacturing plants.

As just one example in connection with a manufacturing plant, a component or device in the plant could be an entity having an associated network of linked data nodes. The data nodes could include data records based on the name of the source/manufacturer of the component, the address of the source, financial accounts associated with the source, maintenance records (across many different facilities) for the component, court/legal actions involving the component/manufacturer, other products/components made by the same manufacturer, distributors and other users of the component, etc. Analysis of the data nodes in such an example could include assessing or forecasting malfunctions, defects, and life cycle issues associated with the component, or forecasting the effectiveness or interaction of the component with other components within the plant.

Figure 2:
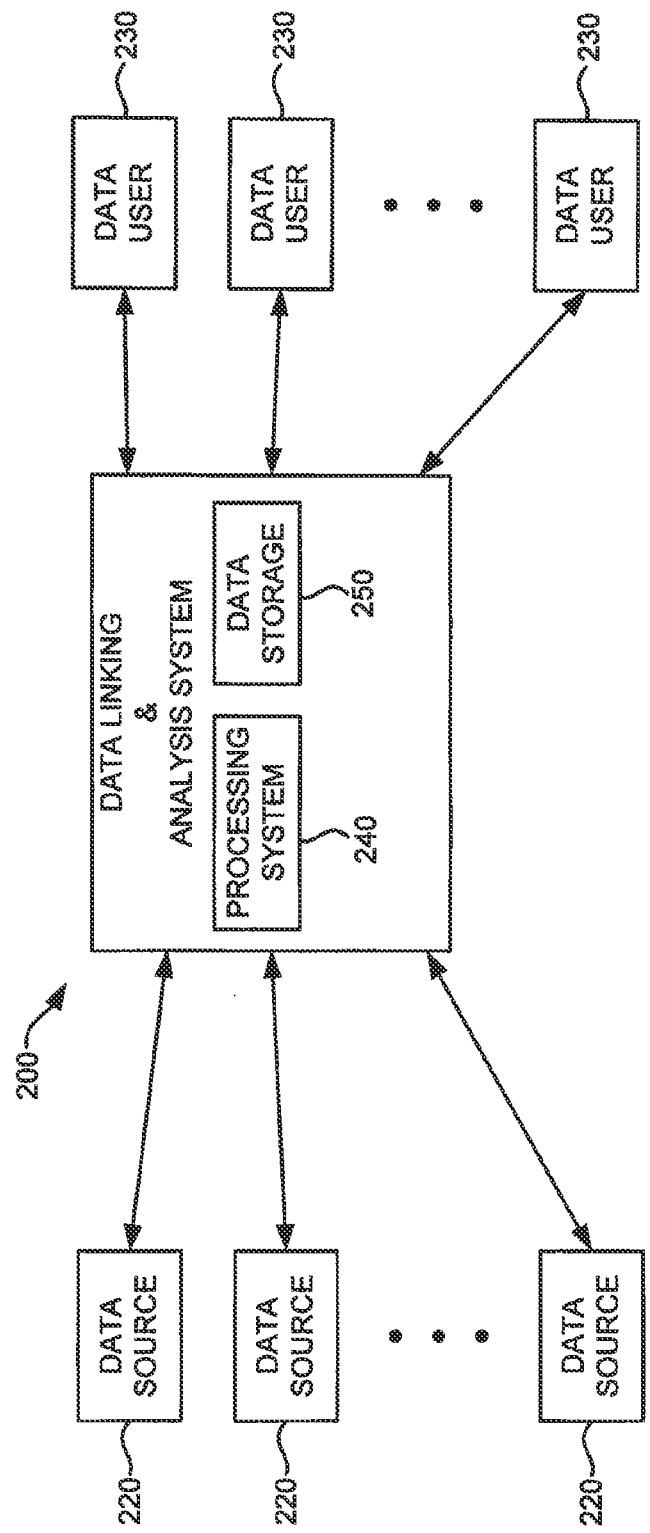
FIG. 2 is a block diagram of a system for analyzing and linking data received from a plurality of data sources in accordance with one embodiment of the invention.

Turning to FIG. 2, there is illustrated a data analysis and linking system 200 in accordance with one embodiment of the invention. In an exemplary environment to be described herein, the system 200 is used by financial institutions to assess financial transactions, and so the system 200 receives data from a plurality of data sources 220 that may have information useful in assessing financial transactions. Linked data stored at the system 200 (such as the network of nodes generally illustrated in FIG. 1) may be provided upon request to any one of a plurality of data users 230 (individuals or organizations) associated with client financial institutions.

The data sources 220 may be large in number and varied in nature. In the case of financial transactions, the contributed data could include the following received from a variety of financial service organizations (e.g., banks, credit card companies, brokerage firms, lenders, mortgage origination companies, traveler's cheque companies, short-term or payday loan companies, financial planners, investment firms, and the like):

New account applications/inquiries
Applications to increase credit limits
Hot files (e.g., serious fraud activities reported to authorities)
Shared fraud records (e.g., records on lower level fraud shared among institutions)
Account abuse records (e.g., as maintained by individual financial institutions)
Account status records (e.g., from individual financial institutions maintaining accounts)
Account verification files (e.g., compiled from check/transaction verification services)
Address changes
Checking/DDA account transaction records (e.g., TIFs—Transaction Item Files)
Returned check records (e.g., RIDs—Return Item Data files)
Check responses
Account owner files (personal data files for account owners, e.g., as maintained by individual financial institutions)
Appendix A attached hereto has a more detailed listing of examples of specific financial/personal data that could be contributed by a financial institution in connection with one of its financial accounts.

The contributed data could also include the following received from non-financial institutions:
Death records (from Social Security Administration)
Records of cell phone and landline numbers assigned by telecommunications companies
Suspicious mailing address records from U.S. Postal Service
Motor vehicle records (from State agencies)
Driver's license records (from State agencies)
Real estate property records (mortgages, deeds, liens, etc.)
Corporate/business filing records
UCC filings Court filings
Telephone directory records
Social network and website data As seen in FIG. 2, the system 200 includes a processing system 240 for processing the data received from the data sources 220 and, more specifically, for performing an ETL (extract, transform and load) operation in order to analyze and process the data for inclusion in a working internal data structure. The processing system further links, analyzes, and scores networks for subsequent analysis by systems analysts or data users. The system 200 also includes a database or data storage system 250 for storing, among other things, (1) data received from the data sources 220 and (2) data defining data nodes and the links or relationships (sometimes referred to as "edges") that have been found between the data nodes. More specifically, the storage device 250 stores data as it is received (in unprocessed form), retains in at least some cases that data for historical purposes, and holds that data for processing at the processing system 240. The storage device 250 also stores linked data nodes (and their linking relationships) that result from linking analysis done on data at the processing system 240.

To manage the stored data nodes (and linking relationships), the storage device could implement matrix-type data arrangements (reflecting data nodes and their relationships to each other). To minimize the required storage space, a sparse array or mesh data structure could be used, reducing the need to utilize storage space for non-zero data elements of the stored matrices. Matrix operations and linear algebra techniques may be accordingly utilized to analyze risks, determine risk networks, and assign scores. As matrix-type operations are often more computationally efficient than linked data structures, improvements in processing efficiency may be accordingly obtained through this approach.

Figure 3:
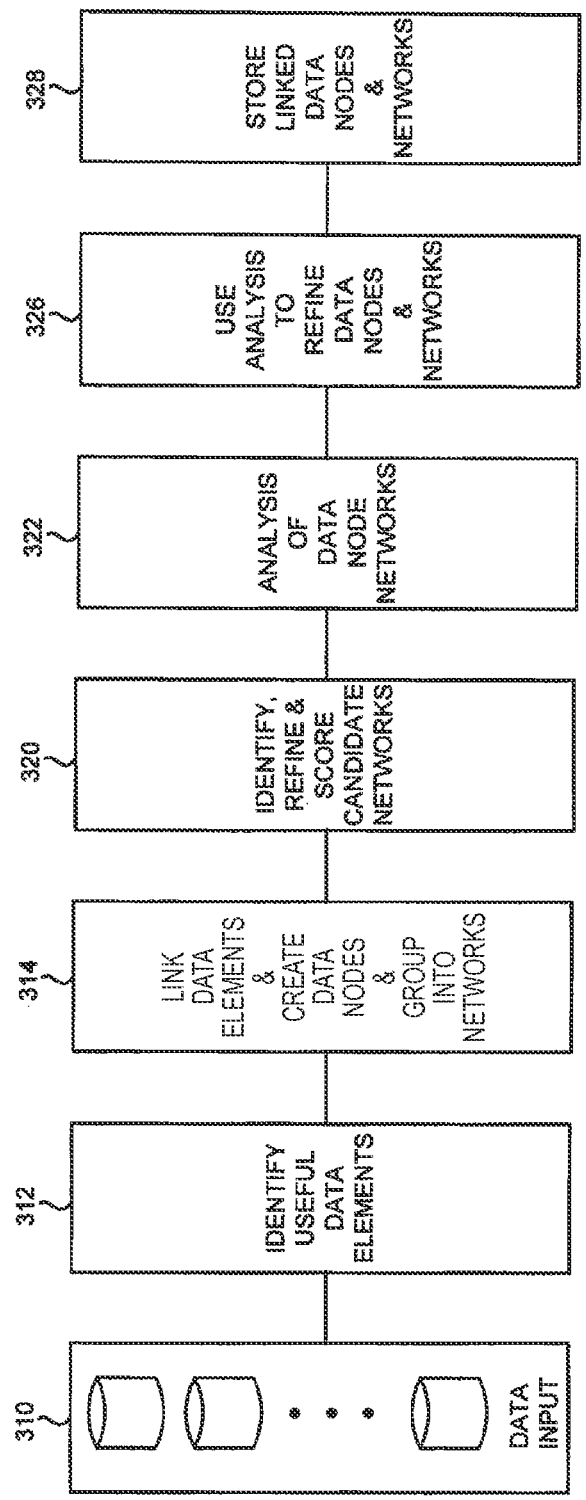
FIG. 3 is a flow diagram of a process for analyzing and linking data using the system of FIG. 2.
Figure 3A:
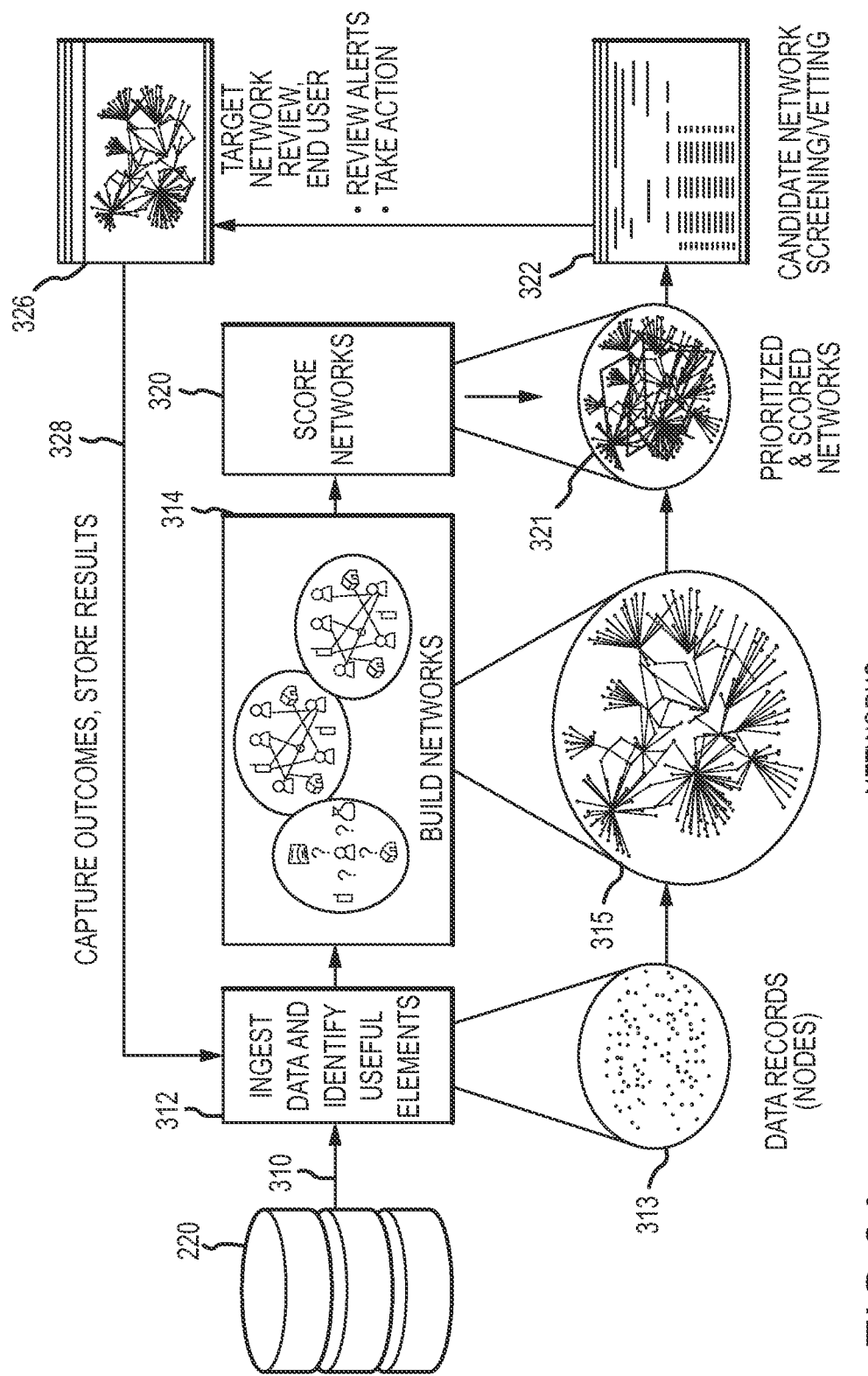
FIG. 3A is another flow diagram of a process for analyzing and linking data using the system of FIG. 2, illustrating the process in an alternate depiction.

FIGS. 3 and 3A illustrate a basic process for creating data nodes (based on data received from data sources 220) and for linking those nodes for subsequent access/use by data users 230. Initially, data is input to system 200 from the data sources 220, as represented by step 310. The inputting of data may be in batch mode (e.g., at periodic intervals, such as once per day, per week, per month, etc.) or could be done on a real-time basis as data becomes available from the data sources 220. As mentioned above, ETL processing of the data may occur to prepare the data for inclusion in the system database (FIG. 2, 250). The data (whether received in batch form or in real-time) is stored in storage device (FIG. 2, 250) for initial analysis at step 312.

At step 312 each data record is parsed to identify useful elements in the records. A useful element is a component or data field that potentially could be used to identify an entity or characteristics of an entity, and thereby link one record (relating to an entity) to another record (that might also relate is some way to that entity). For example, if a personal account information record is received from a bank, each field in the record is reviewed to determine if it would be useful to the linking process. In the case of a personal information record, useful elements would typically be name, address, social security number (SSN), account number, phone number, etc. Other data elements in a data record that might not be as useful are comments appended to the account or similar information which would be difficult to link to other records. Such data elements determined to be non-useful (or less useful) may be removed from the data record. Those elements might be kept or maintained in a historical archive within storage device 250, but discarded for purposes of creating a data node. The process just described at step 312 would be iterative, i.e., repeated for all (or a large number) of the data records being analyzed before progressing to the next step or phase of the process.

At step 314, data elements from different records are linked using the elements identified at step 312. This step is carried out by comparing elements from different data records, and if the compared elements from different records share a certain degree of closeness, similarity, relatedness or commonality, they are linked (at least initially) to each other. It should be appreciated that the degree of "closeness" that would result in a link could be established in advance by the design of the system, such as by parameters input or programmed into the system. In some cases, exactness or near exactness might be expected or required. As an example, in comparing a numerical identifier (e.g., a social security number) from different records, the system might only link the records if the identifiers are identical with respect to every digit. In other instances, if the identifiers are only different by one digit, they might be linked (e.g., to take into account a slight difference that might have been the result of an inadvertent data entry error, or in some cases, the result of a deliberate attempt by a person to conceal a relationship). The same analysis could be used with names, so that only identical names (or names with a single letter being different) are linked. It should be appreciated that, as additional elements of the records are compared, additional matches of data elements (or a failure to find additional matches) may result in initial links being either confirmed or removed. For example, if one element for each of two records are nearly identical, and then a second corresponding element for the two different records is found to be identical or nearly identical, the link between the two records might be confirmed. As a more specific example, three different nodes for individuals with slightly different names might in fact represent a single person if linking information (i.e., social security number or address) are identical or nearly identical. In other cases, where the second corresponding element is much different, the link might be discarded or removed. Obviously the examination and comparison of elements for creating a link between two records can be implemented using various techniques, such as statistical, probabilistic and other predictive methodologies. Such methodologies could be based, e.g., on predetermined rules, on empirical or experiential data, or using neural networks. In some cases, two records may be found to contain the same data (e.g., personal data files for the same person from two different sources), and such a record could be discarded as redundant since it would not be useful as a separate data node.

Also, in some embodiments, the link analysis at step 314 may be performed and refined through several progressive stages. At a first stage, elements from a group of records that have any degree of similarity (even at a low level) are initially linked. At a second stage, the same group of records is then re-examined for "hard links," having data elements easily matched with some degree of certainty (such as having an identical SSN or other unambiguous identifier). If there are records with hard links, those records are confirmed as linked. Any remaining records in the group (without hard links) are then re-examined at a third stage with more sophisticated logic for determining less straightforward relationships or "soft links." As an example, in this third stage, two different names (such as aliases) are linked to each other by determining that they each have one or more common links to a third piece of information or to a third party, such as a common relative, e.g., based on addresses, ages, and parent/child relationships. Also, it may be determined that individuals with similar or identical names are in fact not the same person, but may be related, such as a parent/child, and they are linked for that reason. These are only a few of many possible examples of "soft links."

Once a record (data node) has been analyzed for links, it and its other linked nodes are grouped together in a network that corresponds to a specific entity. As discussed earlier, in many (if not most) cases a data node may consist of the data from a single data record received from a data source. In some cases, several different data records may be filtered and combined to create a single data node. Data nodes prior to linking are illustrated by the visual representation 313 in FIG. 3A, and data nodes linked or grouped into networks are illustrated by the visual representation 315 in FIG. 3A.

In order to manage the data, as records and nodes are linked (e.g., at step 314), identifiers for each node and network (and linking identifiers that identify the links between any nodes) are recorded, in some cases temporarily until networks are finalized and stored for use.

At the next step 320, the various data nodes and links are refined based, for example, on the degree of confidence that they are in fact related. As mentioned earlier, a predetermined level of required closeness or similarity can be designed or built into the link analysis, with links confirmed or discarded based on whether they meet the predetermined level or threshold. However, even the nodes found at this point to be linked because of meeting the threshold may still have wide variance in closeness or confidence in the linkage. At step 320, each of the nodes and links among the pool of created networks are examined to identify candidate networks based, at least in part, on the confidence that the determined link or links and the related entity or entities match a predetermined criterion, such as fraud risk, failure risk, transactional risk, reliability risk, or any other desired criterion. Indicia such as an ordinal score or ranking may be assigned to reflect how closely a candidate network matches the predetermined criterion, and these score indicia or confidence rankings may be utilized to prioritize the investigation of entities that are linked within candidate networks, as the process illustrates in steps 322 and 326.

At step 322, each of the data node networks are further analyzed based on the scored degree of confidence or scoring indicia. Where an identified candidate network receives a high ranking or score (i.e., high degree of confidence that it approximates a predetermined threshold), then it may be prioritized for more urgent analysis compared to candidate networks having lower scores. However, when the score at step 320 is relatively low, an analysis could still be done albeit with less priority, or updated dynamically as network topology changes based on changes to the data from the data sources 220.

The data nodes and candidate networks identified and scored at step 320 are further prioritized for risk at step 321 (FIG. 3A), taking into account the purpose for which the data user is accessing the system 200. For example, if a financial transaction, such as a check deposit, is to be analyzed for risk of fraud, the processing system 240 could review the data nodes and network associated with a specific entity (account number, account holder, etc.) and assign a risk score reflecting the likelihood that the entity is involved in check fraud. That fraud risk score could be determined based on known techniques that, e.g., use various account data to predict fraud risk. However, in this instance, the risk score is not based only on account data, but also on other data at all the other nodes in the network. The risk score associated with a data node or network may be stored in system 200 along with the corresponding data node and network, and with each candidate network, a network identifier such as a task identifier may be stored as well to act as a common key field or point of identification.

Also, different risk scores could be assigned to the same entity and its data node network to accommodate different purposes for accessing the data. As mentioned above, one risk score could be determined and calculated for inquiries relating to deposit of checks. On the other hand, if an inquiry to the system 200 were from a mortgage company relating to a mortgage application by the same entity, a second, different risk score might be calculated, stored and accessed (that second risk score might be based on data more relevant to real estate, such as the market value of property owned by the entity and the outstanding balances on existing mortgagees taken out by the entity). As another example, if the inquiry to system 200 were from a retail merchant in connection with a debit card presented during a retail transaction, a third risk score (based or weighted to give more consideration to data pertinent to retail transactions) might be calculated, stored and accessed.

In an alternative embodiment, rather than only analyzing a large number data records at one time in a batch mode, the process could be dynamic or a combination of a batch mode with dynamic updates. For example, after candidate networks have been identified and scored (steps 314, 320, 321), when a new data record is received from one of the data sources 220, that new record can be analyzed in conjunction with previous data and, if appropriate, new networks, nodes and links and scores can be established in response to the new data record, and a reprioritization of the candidate networks (steps 321, 322) can take place.

Figure 6:
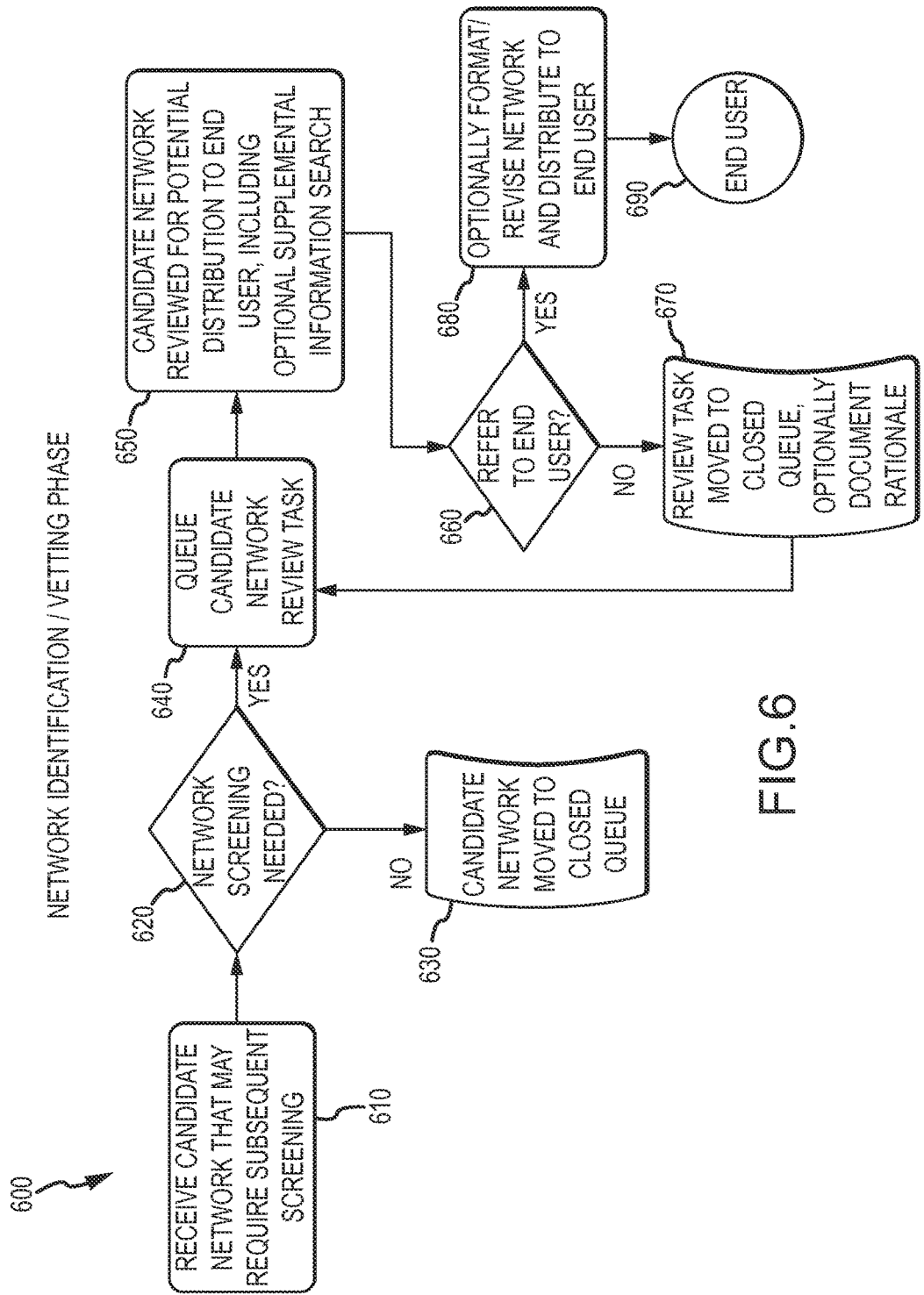
FIG. 6 illustrates a process for network identification and vetting of network candidates before such network candidates are referred to a data (end) user.
Figure 7:
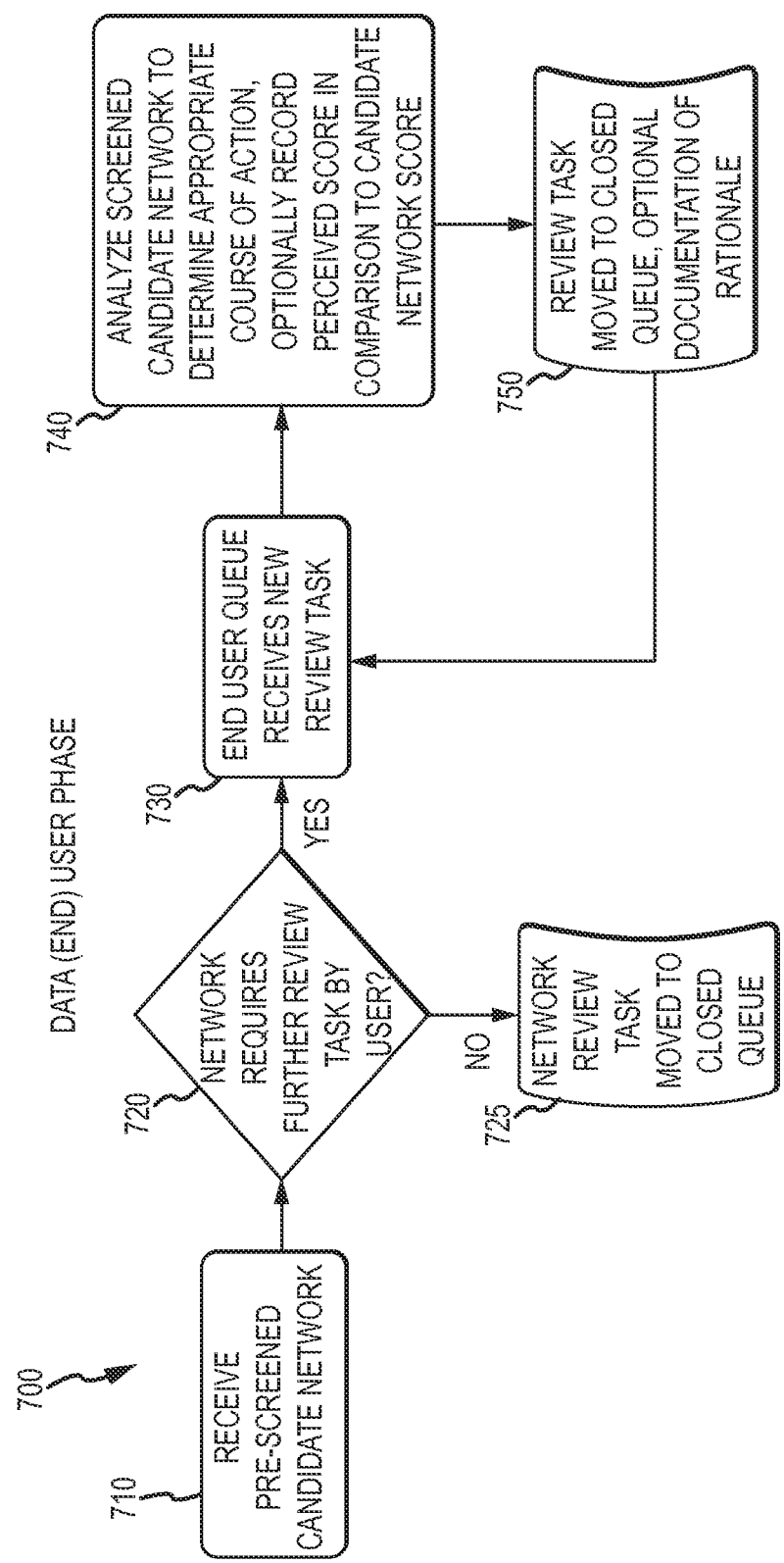
FIG. 7 illustrates a process for data (end) users to receive screened candidate networks and review those networks within a priority management queue.

As those of skill in the art appreciate, extensive amounts of input data may result in a large network that is difficult for a data user to analyze. Therefore, embodiments of the present invention identify candidate sub-networks within larger networks, and then rank those candidate networks by a priority scoring methodology as mentioned above. However, it is possible that a large number of candidate networks of high priority are identified, and require further vetting before being presented to an end user. In step 322, a vetting process may be introduced to pre-analyze, screen, and potentially modify candidate networks that had been identified, scored, and placed in a priority queue. The vetting process may also eliminate potential false positives from the candidate networks before being submitted to the data user for further scrutiny. Further, it may be possible, for example, that a candidate network contains elements that are erroneously identified as risky elements, for instance members of a known fraudster's family, where those family members may have no other indicia of fraud associated with or linked to them. In such a case, the candidate network may be modified to suppress the low risk elements or removed from a queue altogether before being presented to a data user. In some embodiments, the further analysis at step 322 may include a human analysis of linked nodes, and a confirmation or rejection of links based on that human analysis. In other embodiments, this further vetting or refining of networks for further review is performed in an automated or semi-automated manner, based on heuristic approaches, fuzzy logic approaches, expert system approaches, neural network approaches, or any other automated or semi-automated technique for more selectively screening candidate networks and forwarding the networks for end-user review. The vetting process is shown in FIG. 6, as associated with step 322, and in various embodiments, a process for the data (end) user's processing methodology associated with step 326 is illustrated in FIG. 7. FIGS. 6 and 7 will be described in greater detail later.

As an example of an automated vetting candidate network technique, a candidate network received in step 322 is submitted to a neural network engine, wherein the network topology and entity attributes are input to a trained network, and a separate indicator is produced from the network which indicates whether the candidate network should be forwarded to the data (end) user. The neural network engine is trained by entering a training mode and ingesting previously scored candidate networks along with a rating of whether such networks had in fact been deemed of high interest. When such previous candidate networks were highly scored and were of high real interest to the data user, then the neural engine receives positive training reinforcement to adjust neural connection strengths. If a previous candidate network had a high score but had been of low real interest to the data user, the neural weights could be adjusted in a negative manner, indicating that future candidate networks with similar topologies should not be presented to the data user with high priority. Likewise, previous candidate networks that had been assigned low priority scores but were in fact of high real interest to the data user could result in the neural engine being trained to elevate similar networks to higher review priority for future cases. Those of skill in the art also recognize that alternative decision engines such as adaptive expert systems, heuristic engines, adjustable linear programming algorithms, or other adjustable techniques may be used to refine the list of candidate networks and associate priorities before they are presented to data users.

At step 326, the previously linked data nodes and network are reviewed by the data (end) user to determine whether alerts or actions need to be taken. Optionally, the data user may refine the screened candidate network based on any appropriate factors such as the analysis done at step 322. Thus, in the example given above, the three individuals found to be likely the same person have their respective data nodes now grouped together in one network.

Finally, at step 328, the final linked nodes and networks are stored at system 200 for subsequent access by data users 230. For purposes of being stored and indexed in the storage device 250, each network, node, and link may be assigned an identifier. Further, along with each candidate network reviewed by the data user, the data user may enter a perceived value score that ranks how accurately the score associated with the candidate network reflects an actual level of risk (or a perceived level of risk). The perceived score information entered by the data user in step 740 (FIG. 7) may then be subsequently used to improve the accuracy of scoring or identification of candidate networks. For example, the perceived score information entered by the data user may be fed to learning algorithm such as the neural decision engine discussed herein, and in conjunction with the stored score value for the candidate network, an error signal can be generated that reflects the magnitude of the difference between the scored risk and the perceived score, which may then be fed forward to adjust the scoring algorithm or network weights. In this manner, the system automatically adjusts for the scoring of candidate networks that more closely match real-world end-user conditions.

Figure 4:
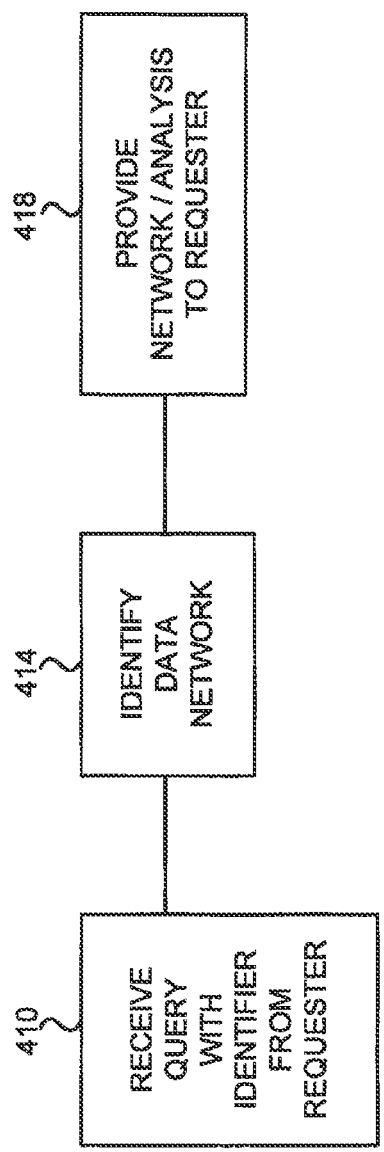
FIG. 4 is a flow diagram illustrating a process in which users access linked data networks using the system of FIG. 1.

FIG. 4 is a general flow diagram illustrating the process for accessing the system 200 by one of the data users 230. At step 410, a query is received from one of the data users with an identifier for the entity of interest. As mentioned earlier, an entity could be, among other things, a person, organization, address, event, device, account, or transaction. Thus, the query could include identifiers such as a name, social security number, account number, phone number, IP address, and so forth. The system 200 would check its database for a data node network corresponding to the entity identifier, and identify the network at step 414.

The data network is then provided to the requester at step 418. The data nodes could be supplied in different forms. For example, the network could be presented in graphical form as seen in FIG. 1 (using hyperlinks at each illustrated node in order to access the underlying data at that node). It could also be provided as a table with a listing of the linked data nodes and the data associated with each node. In addition to (or in lieu of) the data reflecting the network of nodes, the system could provide a risk score based on the data (taking into account the purpose for the query).

Figure 5:
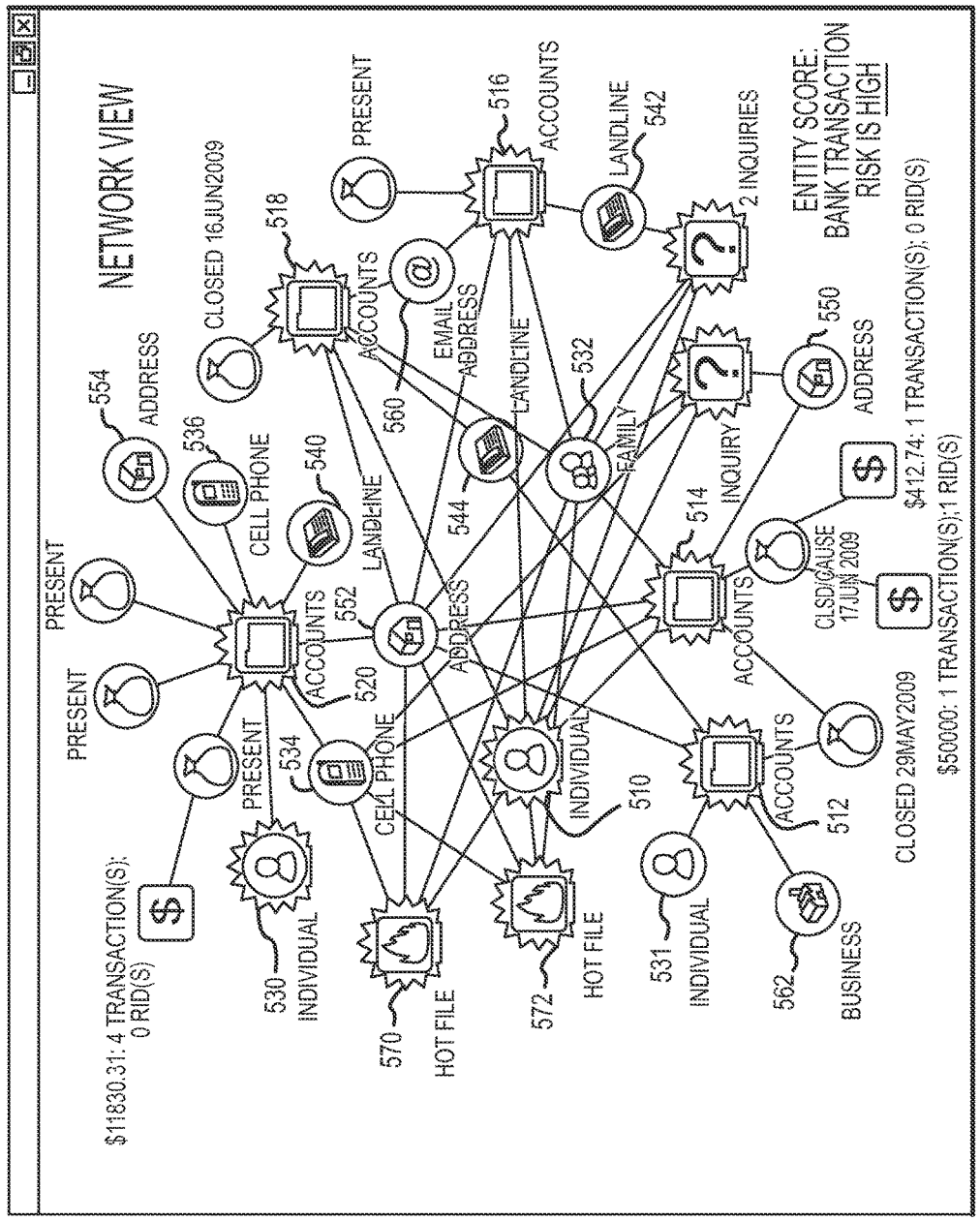
FIG. 5 is a diagram illustrating an embodiment of the invention, wherein a network of data nodes is provided to a financial institution in order to assess the risk of a financial transaction.

FIG. 5 illustrates an exemplary network of data nodes that could be provided to a financial institution in response to a query concerning a person conducting a bank transaction (such as a check deposit).

The network is presented in graphical form on a display device, with each node represented by graphical icon. Each icon can be selected to reveal data underlying that node. In this example, the entity associated with the network is an individual person, whose personal information is at node 510. There are five accounts directly or indirectly linked to the person (nodes 512-520). There are also linked nodes for other individuals (nodes 530, 531), family members (node 532), cell phones (nodes 534, 536), landlines (nodes 540, 542, 544), addresses (nodes 550, 552, 554), an email address (node 560) and a business (node 562). Also appearing are hot files (nodes 570, 572) indicating data on fraudulent activity, and several various icons in association with each of the accounts indicating a status or event associated with that account (such nodes not individually numbered).

In this example, there is also a risk score for this entity (and corresponding network) calculated for bank transactions, displayed on the screen and indicated as "high." As an alternative, the risk score could be numerical, say "1" to "10", with "10" indicating the highest risk.

Figure 5A:
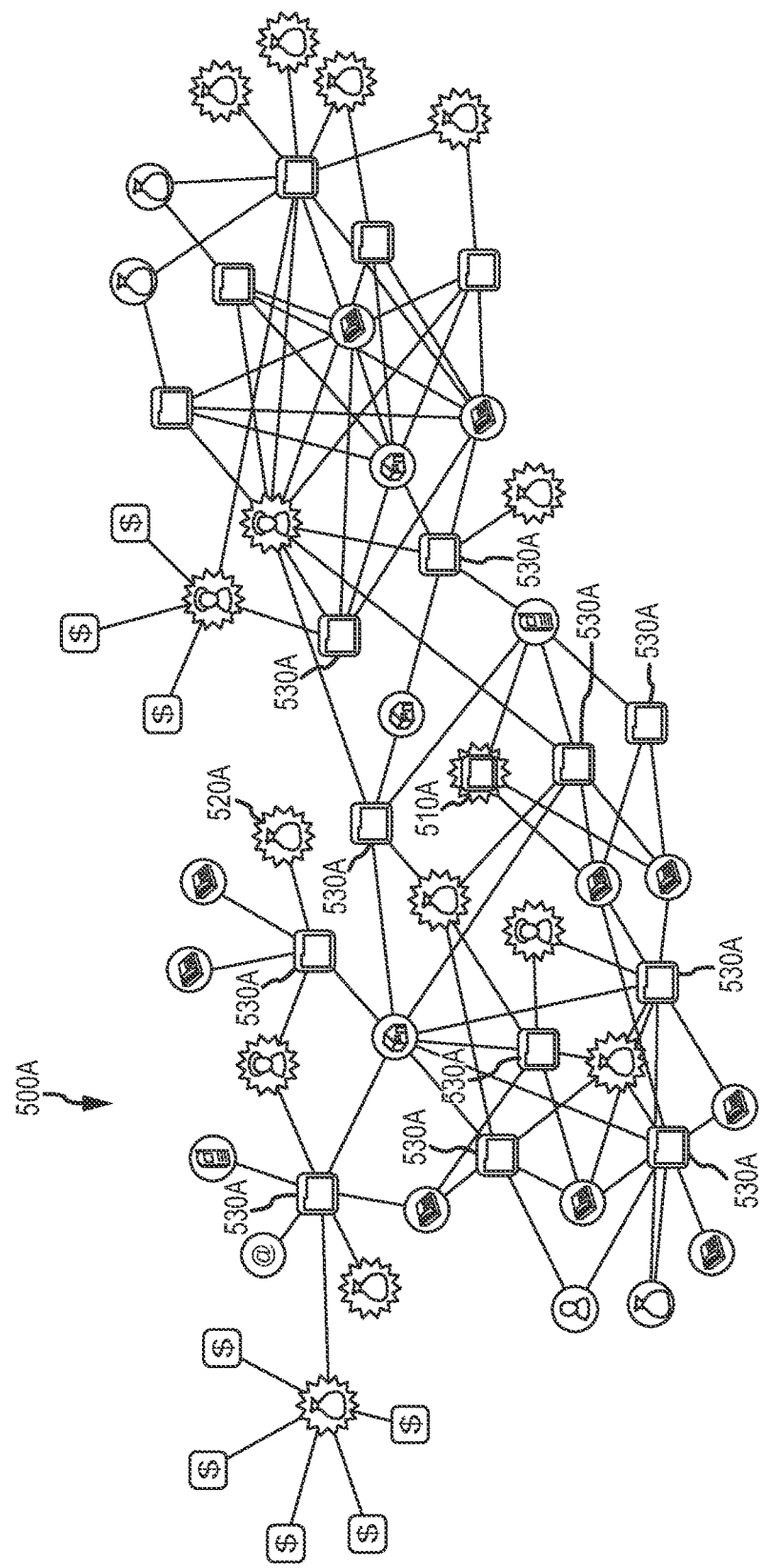
FIG. 5A depicts an exemplary low-risk candidate network.
Figure 5B:
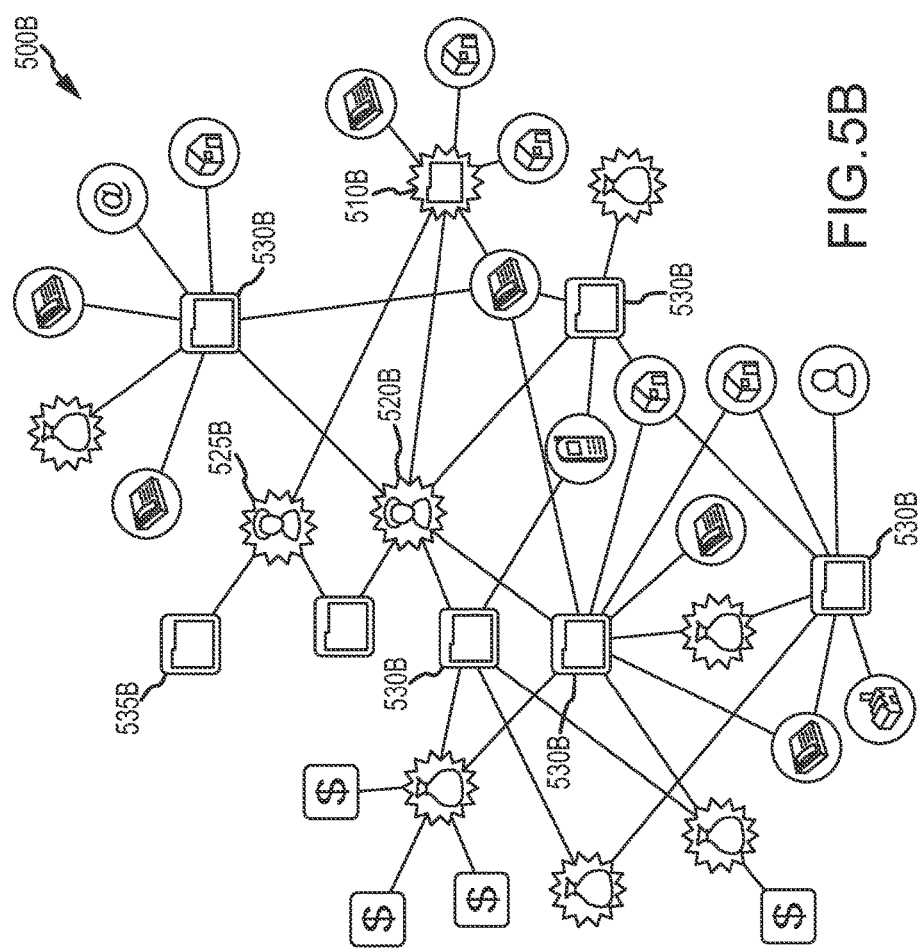
FIG. 5B depicts an exemplary moderate-risk candidate network.
Figure 5C:
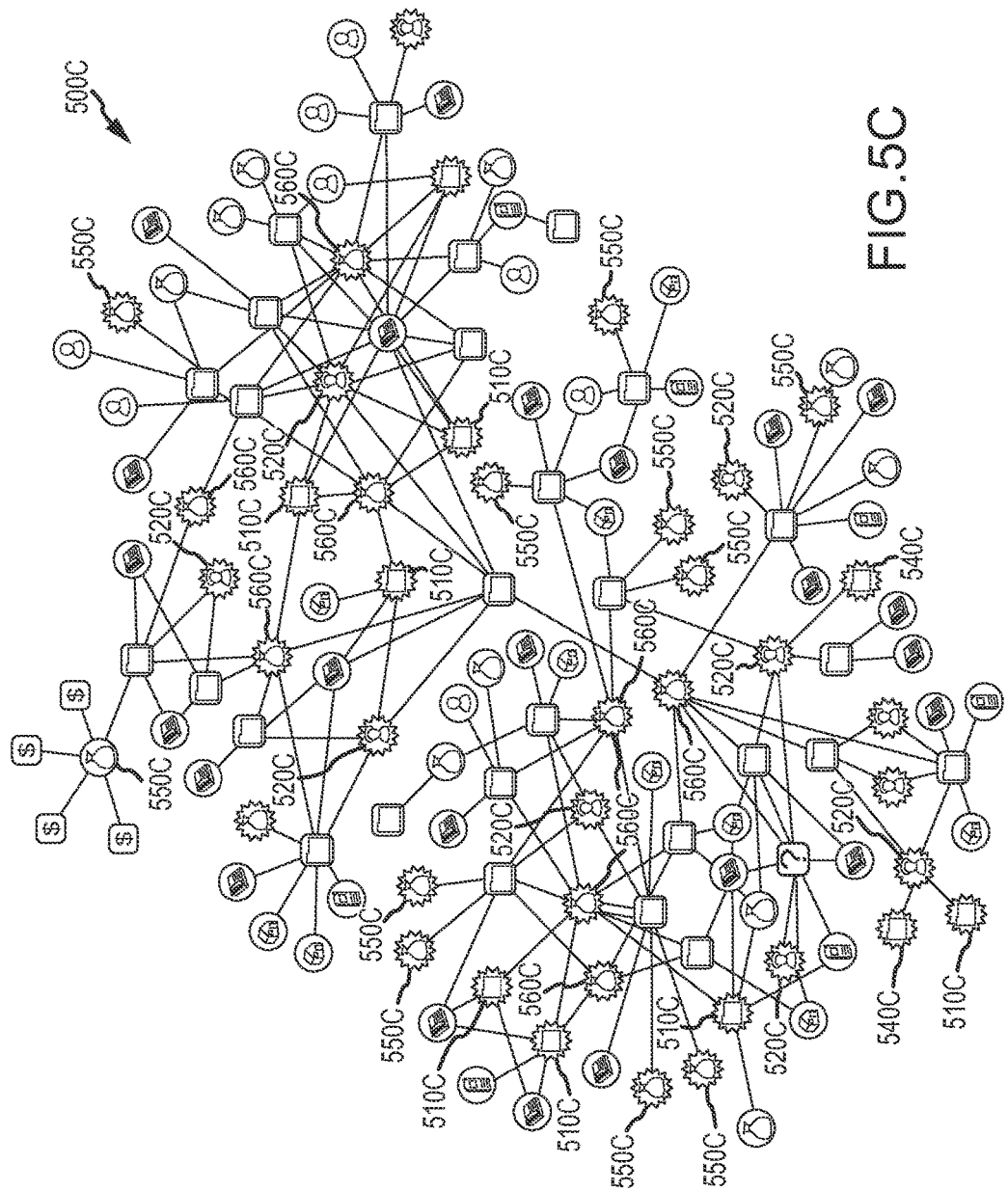
FIG. 5C depicts an exemplary high-risk candidate network.

Three examples of candidate networks with varying levels of scored risk are shown in FIGS. 5A-5C. Turning to FIG. 5A, a candidate network 500A is presented that would be considered a "low risk" based on the likelihood of fraudulent events occurring. The exemplary candidate network 500A only contains one account abuse node (510A) for a very small loss, one account that was closed for cause (520A) and no other fraud records. Even though there are several open demand deposit accounts (a.k.a. "checking" accounts) (530A) at a plurality of financial institutions, this network would normally be evaluated to produce an indicia of low risk. The reviewing or vetting process would take into account the date and amount of the account abuse as it is not always fraud but could be bad account management. Also, the vetting process would consider which entity contributed the account abuse, and if the financial institution still had open accounts for the abusing entity, it is likely the institution would not consider the abusing entity fraudulent.

FIG. 5B depicts an exemplary candidate network 500B that would result in a moderate level of scored risk. The moderate-risk-scored candidate network 500B has one shared fraud record (510B) that has been recently reported on two individuals (520B, 525B) in this network 500B. Both of these individuals (520B, 525B) currently have open DDA accounts at a plurality of financial institutions (530B, 535B). Even though there is only one fraud record 510B, because it is a shared fraud and was recently contributed, that factor combined with the six open DDA accounts (530B, 535B) at a variety of financial institutions raises the scored risk level to a moderate level.

FIG. 5C depicts a high risk scored candidate network 500C. There are eight individuals (520C) that share attributes such as: a cell phone, a landline, or an email address (shown but not annotated with reference numerals for clarity). This candidate network 500C also contains seven shared fraud records (510C) contributed by multiple financial institutions. The candidate network 500C also contains two account abuse records (540C) with over $3,000.00 in losses and eleven accounts that have been closed for cause (550C). Also contributing to the risk of this network are over $10,000 in returned transactions or RID's. The candidate network 500C also has six open DDA accounts (560C). With the combined risk factors described in regards to candidate network 500C, this network would be scored as a high risk network, and entities including individuals in the network should be scrutinized carefully by the data (end) user.

Turning now the FIG. 6, there is illustrated one example of a process implemented by system 200 for analyzing and vetting candidate networks (step 322 in FIGS. 3 and 3A), prior to being provided to a data user. At step 610, a network is provided to the processing system 240 in order to determine whether vetting or screening of the network is needed, step 620. In one embodiment, and in a manner similar to previously discussed scoring of networks, one criterion for establishing a need for vetting may be the degree of confidence in the network. As also mentioned earlier, the degree confidence needed may depend on the particular use for the network (e.g., a use that may a high degree of scrutiny due to the size of a transaction or a use in connection with significant threats relating to terrorist activity, may have a higher need for vetting and screening). If no screening is needed, then the process may end at step 630, and the network is made available (when needed) for use by a data (end) user.

If screening is needed, the network to be vetted is placed in a queue at step 640. In some embodiments, the queue may be first-in-first out, but in other implementations, the networks to be screened may be ordered (e.g., according to the nature of the transaction ultimately being evaluated), with some queued networks put in a higher order than others based on the criticality or importance of the anticipated use of the network. The network is then reviewed, analyzed and modified (if necessary) at step 650. In some cases, for example, as a result of the screening or vetting, the date nodes in the candidate network may be found to be incomplete or suspect as to accuracy, or their links not reliable and so supplemental information may be sought at step 650. One example of automated vetting and refining candidate networks using a neural network engine was described earlier. In some cases, it may be desirable for the candidate network to also be vetted by an end user, as may be the case if a screened candidate network indicates a likelihood of any particular target condition occurring, for example, the likelihood of financial fraud arising from an entity identified in the screened candidate network. If end user review is desired (step 660), the network may be further formatted or revised to a form more readily reviewable by the end user at step 680, and then provided to the end user at step 690. In certain embodiments, sensitive information may be redacted from a candidate network before presentment to a user, for instance to prevent undesired propagation of the sensitive information outside of a controlled environment. In some cases further vetting by the end user is not deemed needed or desirable (at least initially), as may be the case if a candidate network meets any particular predetermined condition, such as a likelihood for fraudulent conditions being below a particular predetermined threshold, or if law enforcement has requested the candidate network not to be reviewed pending a criminal investigation. In such case, the vetting ends with the review task closed (and documented, if appropriate) at step 670. In some instances, as illustrated, the candidate network may ultimately need further vetting (e.g., the candidate network was simply not ripe for review because not enough information was available within the system or from the end user to refine the network) and it is held at the vetting phase (even if the review task is closed) until vetting can again be attempted (e.g., when additional information relevant to the network is received by the system).

FIG. 7 illustrates one example of a process implemented by system 200 in which an end user receives and scores a screened candidate network. A candidate network is received at step 710, and if a review is required by a user (step 720), then the candidate network is placed in a queue (step 730) for the end user to review and score the network. If an end user review is not required at step 720, then the network is placed in a closed queue and the process may end at step 725, with the network simply made available (when needed) for use by a data (end) user. It should be noted that, as described earlier, the end user may score a network when (or if) the end user makes use of the network, even if put into closed queue at step 725.

If end user is required at step 720, then the network is placed in a queue for the review at step 730. When an end user reviews the network at step 740 and determines an appropriate action on the network (such as a perceived score for the network from the end user), the review task is closed (and documented, if appropriate) at step 750. In some instances, as illustrated, the candidate network may ultimately need further end user review (e.g., the end user may not have had sufficient data to produce a perceived score) and it is held at the end user queue (even if the review task is closed) until end user review can again be attempted (e.g., when additional data relevant to the network is received by the system). Also as shown, in step 740, the end user may optionally record a perceived or end-user score or other indicia to rank the accuracy of the candidate network score, and this perceived or end user score or indicia may be further utilized to improve the accuracy of candidate network identification process, as described above.

Candidate networks may be provided to an end user in any desired form. In an embodiment, a 'snapshot' can be captured of a particular candidate network, and this 'snapshot' may be provided to the end user in any desired form, such as a graphical depiction (e.g., in a digital image such as Portable Document File (PDF) or TIFF or JPEG image), or in a data format that may be used to interactively analyze network nodes and links and determine scoring characteristics of any particular network element. As candidate networks are typically subsets of larger data networks, the 'snapshot' approach may serve to partition the data set to exclude any information from the end user's view, such as confidential or irrelevant information that exists in the larger origin network. In another embodiment, indicia or identifiers regarding candidate networks that should be reviewed by an end user are placed in the queue, and the end users, rather than receiving a 'snapshot' of a candidate network, may access the system 200 to retrieve a queued indicia of a candidate network, and utilizing the queued indicia, they may retrieve and view the network in the system 200 remotely. In this latter embodiment, if end users are permitted to access the system 200 remotely, data that is made accessible to the end users is sequestered by any conventional means such as access control lists (acls) or custom user id/password systems to prevent the end users' access to any network components not required to review the risks associated with the candidate networks.

Figure 8:
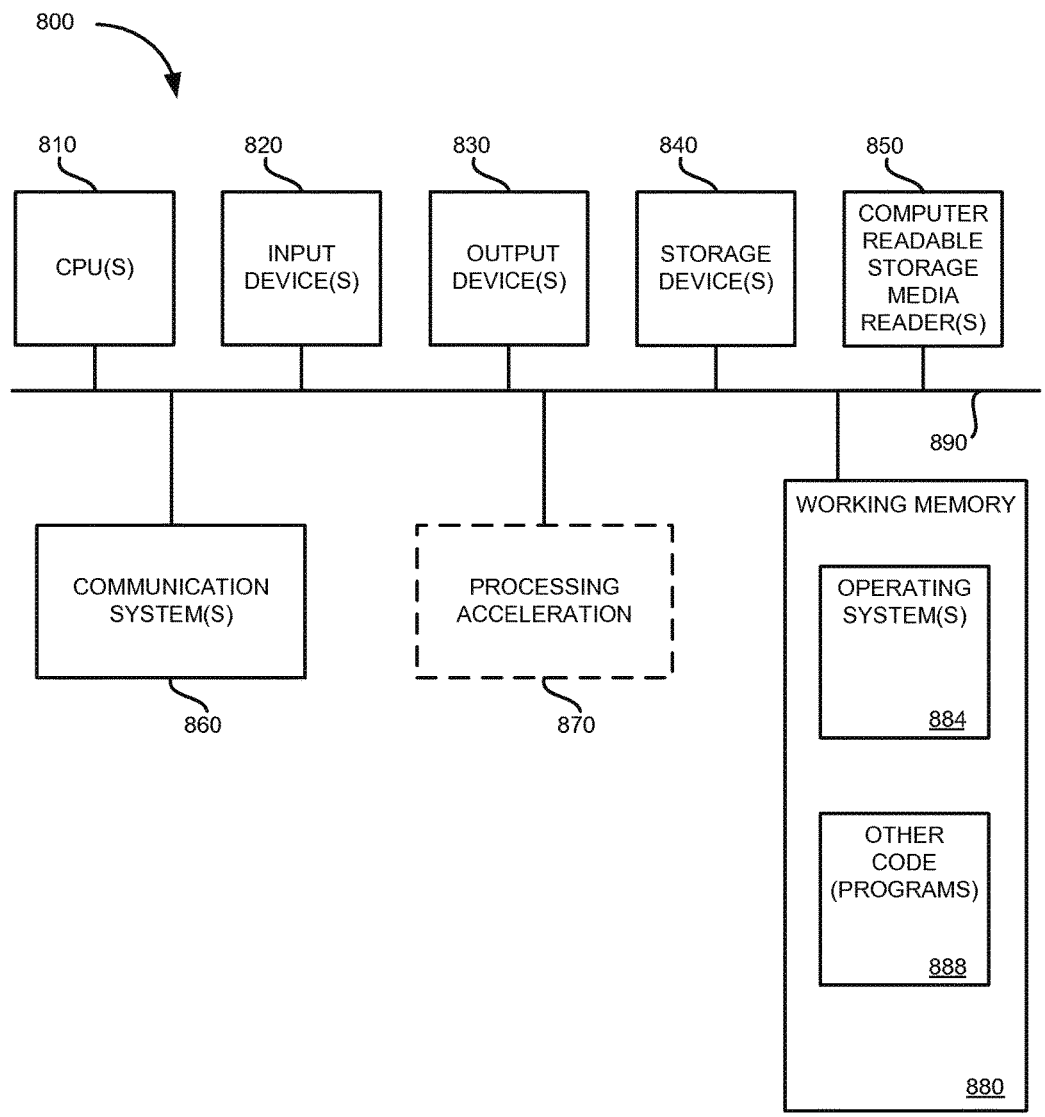
FIG. 8 is a block diagram illustrating an exemplary computer system upon which embodiments of the present invention may be implemented.

FIG. 8 is a block diagram illustrating an exemplary computer system upon which embodiments of the present invention may be implemented. This example illustrates a computer system 800 such as may be used, in whole, in part, or with various modifications, to provide the functions of the system 200, as well as other components and functions of the invention described herein.

The computer system 800 is shown comprising hardware elements that may be electrically coupled via a bus 890. The hardware elements may include one or more central processing units 810, one or more input devices 820 (e.g., a mouse, a keyboard, etc.), and one or more output devices 830 (e.g., a display device, a printer, etc.). The computer system 800 may also include one or more storage devices 840, representing remote, local, fixed, and/or removable storage devices and storage media for temporarily and/or more permanently containing computer-readable information, and one or more storage media reader(s) 850 for accessing the storage device(s) 840. By way of example, storage device(s) 840 may be disk drives, optical storage devices, solid-state storage device such as a random access memory ("RAM") and/or a read-only memory ("ROM"), which can be programmable, flash-updateable or the like.

The computer system 800 may additionally include a communications system 860 (e.g., a modem, a network card—wireless or wired, an infra-red communication device, a Bluetooth™ device, a near field communications (NFC) device, a cellular communication device, etc.) The communications system 860 may permit data to be exchanged with a network, system, computer, mobile device and/or other component as described earlier. The system 800 also includes working memory 880, which may include RAM and ROM devices as described above. In some embodiments, the computer system 800 may also include a processing acceleration unit 870, which can include a digital signal processor, a special-purpose processor and/or the like.

The computer system 800 may also comprise software elements, shown as being located within a working memory 880, including an operating system 884 and/or other code 888. Software code 888 may be used for implementing functions of various elements of the architecture as described herein. For example, software stored on and/or executed by a computer system, such as system 800, can be used in implementing the processes seen in FIGS. 3, 3A, 4, 6 and 7.

It should be appreciated that alternative embodiments of a computer system 800 may have numerous variations from that described above. For example, customized hardware might also be used and/or particular elements might be implemented in hardware, software (including portable software, such as applets), or both. Furthermore, there may be connection to other computing devices such as network input/output and data acquisition devices (not shown).

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention.

As one example, the system 200 system may be implemented by a single system having one or more storage device and processing elements. As another example, the data linking and analysis system 200 may be implemented by plural systems, with their respective functions distributed across different systems either in one location or across a plurality of linked locations.

Moreover, while the various flows and processes described herein (e.g., those illustrated in FIGS. 3, 3A, 4, 6 and 7) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Consequently, although the invention has been described with respect to exemplary embodiments, it will be appreciated that the invention is intended to cover all modifications and equivalents within the scope of the following claims.

APPENDIX A

| People/Entity Data | Transaction Related Data |
| --- | --- |
| Account Number | (ON/US OFF/US) ACH Transactions (Returns, Debits, and Credits) |
| DDA Account Status | Wire Transactions |
| Name | Account Balance Data |
| Address | CR/DR Line Availability |
| Date of Birth | Digital ID |
| ID/DL Number, Type of Issuance | Wire Limits |
| ID Issue Date/Expiration Date | ACH Limits |
| Home Phone/Work Phone | Purchase/Withdrawal Limits |
| Social Security Number/Tax ID | ATM Only (Y/N) |
| Email Address | Account to DDA # Conversion |
| Account Type (Consumer or Business) | Card Issue Date |
| Product Type (User Defined) | Card Expiration Date |
| Account Origination Channel (Enrollment & Transactions) | MICR Conversion Logic (Convenience Checks) |
| Other Authorized Signers | Convenience Check Expiration & Issuance Date |
| Relationship Data | Bill Payment Transactions |
| Shared Fraud Data | Market Value (Securities) |
| Reg-E Claim Data | Other Internal DR/CR |
| Account Abuse | Debit card transactions |
| Bad Recipient | All Items Files |
| Bad Originators | Stop Payments |
| Bad Merchants | ACH blocks |
| Phone Access - Dynamic Data | Check Return items |
| Bad Actors involved in Real Esta | Card Authorizations |
| Transaction Origination Channel | Card Disputes/fraud claims |
| Account Status Victim or Perp Flag | Merchant chargeback |
| Savings Account Status | SARs (Suspicious Activities Reports) Information |
| ABA & Acct # added to ID Checks | Paid Items Files |
| Signature | Positive Pay Files |

What is claimed is:

1. A method, comprising:
   receiving, by a processing system, a plurality of data records from a plurality of data sources, the data records comprising information corresponding to a plurality of entities, each data record comprising one or more data elements, with at least some of the data elements relevant to risk;

comparing, by the processing system, data elements from the plurality of data records to determine if those data elements have common characteristics;

determining, by the processing system, when a data element from a data record in the plurality of data records has a characteristic in common with a data element in other data records in the plurality of data records, and in response to the determining, linking the data records that have data elements with common characteristics, including directly linking one data record to each of the other data records having the characteristic in common with the one data record, by creating, by the processing system, linking identifiers that each identifies one of the links between the one data record and each one of the other data records to which the one data record has been directly linked, and indirectly linking the one data record to other data records not directly linked by creating, by the processing system, linking identifiers that each identifies one of the links between data records directly linked to the one data record and other data records in the plurality of data records linked to the directly linked data records;

storing, by the processing system, the directly and indirectly linked data records in a database, wherein the directly and indirectly linked data records are represented in a form of corresponding data nodes, wherein the directly and indirectly linked data records and their corresponding nodes are grouped in a data network, and wherein the directly and indirectly linked data records and the data network in which they are grouped are associated with an entity;

storing in the database, by the processing system, in association with the one linked data record, the linking identifiers that each identifies one of the links between the directly and indirectly linked data records and their corresponding nodes grouped in the data network;

receiving, by the processing system, an entity identifier of the entity that is separate from the linking identifier, that identifies the entity, and that is used to access at least the one data record;

accessing the one data record in the database using the entity identifier;

in response to the accessing the one data record, providing, by the processing system, each linking identifier that identifies a link between that one data record and each of the other data records directly and indirectly linked to that one data record;

using, by the processing system, each linking identifier to access each of the other data records directly and indirectly linked to that one data record, and thereby provide access to the data network, in which the linked data records are grouped, in response to receiving the entity identifier;

assessing, by the processing system, risk for the entity based on analysis of the data network, including the linked data records; and creating a risk score reflecting the assessed risk for the entity, based on the analysis of the data network.

2. The method of claim 1, wherein the data sources comprise at least financial institutions and wherein the data records comprise at least financial information corresponding to the entities.

3. The method of claim 2, wherein the data sources further comprise non-financial institutions, and wherein the data records are selected from the group consisting of death records, telephone number records, mailing address records, motor vehicle records, driver's license records, real estate property records, business filing records, court filing records, and social network data records.

4. The method of claim 2, wherein the risk score is further based on an anticipated purpose for accessing the data network.

5. The method of claim 2, further comprising:
prior to comparing data elements, parsing, by the processing system, each received data record in order to identify data elements of each received data record; and
removing, by the processing system, from the data record any data elements determined to be not useful to the analysis of the data network.

6. The method of claim 5, wherein the removed data elements are maintained at a historical archive.

7. The method of claim 2, further comprising:
ranking, by the processing system, the data network based on confidence in the degree of shared commonality between the linked data records having common characteristics.

8. The method of claim 7, wherein other data networks are formed from grouping other data records having data elements with common characteristics, and wherein the method further comprises:
prioritizing, by the processing system, the data network in relation to the other data networks based on the ranking of the data network.

9. The method of claim 8, further comprising:
analyzing, by the processing system, the data network based on its priority, wherein the linking of the data records is confirmed or rejected.

10. The method of claim 2, wherein the accessed data network is provided to an end user, and wherein the method further comprises:
receiving, by the processing system, a perceived score from the end user, the perceived score reflecting the accuracy of the created risk score.

11. The method of claim 2, wherein the entity identifier is received in connection with a financial transaction, and wherein the access to the data network is provided to an end user to evaluate a risk associated with the financial transaction.

12. The method of claim 2, wherein the entity is selected from the group consisting of an individual, organization, address, event, device, account, or transaction.

13. The method of claim 2, further comprising:
storing the created risk score in association with the data network.

14. The method of claim 1, further comprising:
storing in the database, by the processing system, a node identifier for identifying each of the nodes grouped in the data network and a network identifier identifying the data network.

15. A system for assessing risk associated with an entity, comprising one or more processors programmed to:
create, in a database, a plurality of data nodes representing data received from a plurality of data sources, each data node comprising one or more data elements that are relevant to risk;
determine that a data element in one data node has an identified relationship to a data element in other data nodes in the plurality of data nodes;

create linking identifiers for linking the data nodes into a data node network, each linking identifier identifying a link that represents an identified relationship between at least one data element of one data node in the plurality of data nodes and at least one data element of other data nodes in the plurality of data nodes, including:
  directly linking the one data node to each of other data nodes having data elements with the identified relationship to data elements of the one data node, by creating linking identifiers that each identifies one of the links between the one data node and each one of the other data nodes to which the one data node has been directly linked, and
  indirectly linking the one data node to other data nodes not directly linked, by creating linking identifiers that each identifies one of the links between data nodes directly linked to the one data node and other data nodes in the plurality of data nodes linked to the directly linked data records,
  wherein the data node network is associated with an entity and includes directly and indirectly linked data nodes that relate to that entity;
store, in the database, and in association with the one data node, the linking identifiers that identify the direct and indirect links between the one data node and each one of the other data nodes in the data node network that have been directly and indirectly linked to the one data node;
receive an entity identifier for the entity that is separate from the linking identifier and that is used to access at least the one data node;
provide access to the one data node in the data node network in response to receiving the entity identifier;
in response to providing access to the one data node, providing linking identifiers that identify the direct and indirect links between the one data node and each one of the other data nodes in the data node network, in order to also access each one of the other data nodes in the data node network; and
create a risk score for the entity based on analysis of the data node network.

16. The system of claim 15, wherein the data sources comprise at least financial institutions, and wherein the data records comprise at least financial information corresponding to the entity.

17. The system of claim 15, wherein the one or more processors are further programmed to:
  store the risk score in association with the data node network.

18. The system of claim 15, wherein the risk score is further based on an anticipated purpose for accessing the data node network.

19. The system of claim 15, wherein the one or more processors are further programmed to:
  rank the data node network based on confidence in the relationship between the linked data nodes.

20. The system of claim 19, wherein the one or more processors are further programmed to:
  prioritize the data node network in relation to other data node networks based on the ranking of the data node network.

21. The system of claim 20, wherein the one or more processors are further programmed to:
  analyze the data node network based on its priority, wherein each identified relationship is confirmed or rejected.

22. The system of claim 15, wherein the accessed data node network is provided to an end user, and wherein the one or more processors are further programmed to:
  receive a perceived score from the end user, the perceived score reflecting the accuracy of the created risk score.

23. The system of claim 15, wherein the entity identifier is received in connection with a financial transaction, and wherein the access to the data node network is provided to an end user to evaluate a risk associated with the financial transaction.

24. The system of claim 15, wherein the entity is selected from the group consisting of an individual, organization, address, event, device, account, or transaction.

25. The system of claim 15, wherein the one or more processors are further programmed to:
  store in the database a node identifier for identifying each one of the nodes in the data node network and a network identifier for identifying the data node network.

* * * * *